May 28, 1963 A. THESZ 3,091,048
FISHING POLES
Filed Sept. 28, 1961
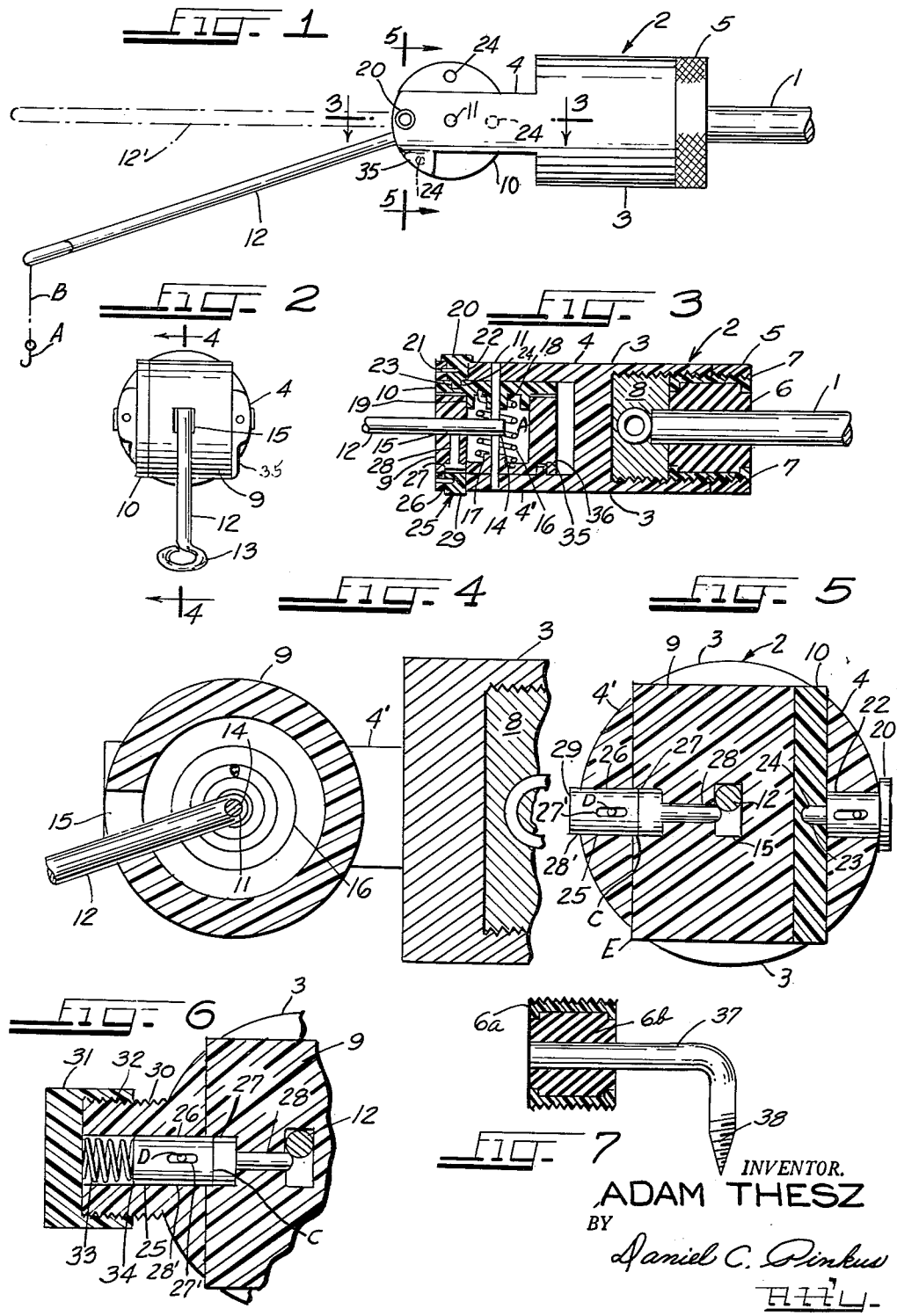
INVENTOR.
ADAM THESZ
BY
Daniel C. Pinkus

United States Patent Office 3,091,048
Patented May 28, 1963

3,091,048
FISHING POLES
Adam Thesz, 4459 W. Washington Blvd., Chicago, Ill.
Filed Sept. 28, 1961, Ser. No. 141,367
2 Claims. (Cl. 43—15)

The present invention relates to new and useful improvements in fishing poles and more particularly to the type described in my co-pending application No. 103,540, filed April 17, 1961 (now abandoned).

The principal object of this invention is to provide a device herein described as an attachment for a standard fishing pole; said device having a flexible spring action for catching a fish on a hook when the fish bites on the bait attached to the hook.

A further object of this invention is to provide a triggering lever that fits slightly under the extension fishing rod and whereby movement of said fishing rod downward (as when a fish nibbles on the hook) forcing the triggering lever outward which trips the attachment device thereby revolving the fish pole extension device upward and thereby setting the hook in the fish's mouth.

Other novel features of advantage and construction will be more clearly understood from the following specification and the accompanying drawing in which:

FIGURE 1 is a perspective view of the fish pole attachment device;

FIGURE 2 is a front view showing the extension pole and device;

FIGURE 3 is a sectional view on lines 3—3 of FIG. 1;

FIGURE 4 is a cut-a-way view of FIG. 2;

FIGURE 5 is a cut-a-way view on lines 5—5 of FIG. 1;

FIGURE 6 is a modification of triggering lever shown in FIG. 5, and

FIGURE 7 shows a device for fastening or mounting a pole securely.

Referring now to the accompanying drawings in detail, numeral 1 denotes the end of a standard fishing pole. Attached to the fish pole 1 is an attachment device 2 having a body 3 and extension arms 4 and 4'. A retaining ring 5 has an inside thread 7 which screws onto a resilient material body 6 and applies pressure onto the fish pole 1, thereby holding it rigidly in place. The end of the pole 1 fits into an opening 8 in the body 3. Between the opening formed by the extension arms 4 and 4', there is set a drum-like structure unit 9 having a knob 10 which fits snugly against the drum unit 9. An axle 11 extends through openings in the drum 9, the knob 10 and the extension arms 4 and 4'.

The extension pole 12 of the attachment device 2 has an eye 13 and a hook A and line B attached thereto. At the other end of the pole 12 there is a hole 14 through same. The axle 11 extends through the hole 14. The pole 12 projects through a slotted opening 15 in the drum 9. There is a coiled tension spring 16 fitted in the opening A in the drum 9 and is attached at one end to an abutment 17 of the drum 9 and at its other end to an abutment 18 of the knob 10. Numeral 19 denotes a snug facing fit on the knob 10, whereby the knob 10 can be turned to increase or decrease the tension of the spring 16. There is a set pin 20 having an extension 21 for holding the pin in the extension arm 4. An opening 22 in the arm 4 allows the pin 20 to fit into the knob 10 by means of an extended end 23 which sets into one of four openings 24 in the top surface of knob 10. The knob 10 when wound in a counter clockwise direction increases the tension on the spring 16 and the pin end 23 fits into one of the openings 24 in the knob 10 after desired tension is placed on said spring 16. A molded portion 35 of the arms 4 and 4' fits into a cavity opening 36 in the drum unit 9 and governs degrees of movement.

A pin lever 25 which fits through an opening 26 in the arm 4' and an opening 27 in the drum 9. The lever 25 is of two pieces, an end 28 which fits slightly below the rod 12 and an outer part 28'. This lever 25 has a flattened head 29 which fits against the outside edge of the extension arm 4'. Separation of the two parts 28 and 28' is at point C. The outer part 28' has a slot 27' therethrough. A pin D extends through the slot 27' and it is fastened to the arm 4' of the body 3. The slot 27' allows movement of the part 28' into and out of the drum 9. The pin D restricts the part 28' from coming completely out of the arm 4', while at the same time allowing part 28' to come out of the drum 9. When the end 28' is pushed out of the drum 9, the point C lines up with the outer end E of the drum 9. The friction caused by the lever 25 against the sides of the opening 26 is the means for holding the lever 25 in its inward position as shown in FIG. 5.

A modification of the trip lever 25 is shown in FIG. 6. Like parts are shown with an added feature of a threaded projection 30 formed on the arm 4'. Threaded projection 30 should have inside diameter space to allow pin 25 sliding fit. On projection 30 there is a screw cap 31, which has an inside thread 32. A coiled spring 33 rests against the flat end 34 of the lever 25. This modified form gives added spring tension to the release lever 25 for tripping the pole 12 after a fish bites on the hook. This spring tension also serves to prevent premature triggering of device before the fish bites.

To illustrate the action of the attachment device, first the drum-like portion 9 has to be wound by turning the knob 10 and setting the pin 20 into one of the openings 24. This puts the necessary spring like tension on the pole 12, putting it into a cocked position of 45 degrees angle to the line of pole 1. Then the lever 25 is inserted into the drum 9 and fits slightly below the pole 12. When a fish nibbles on the line attached to the eye 13 of the pole 12, a slight movement of the pole 12 forces the pin 25 out of the drum 9. This causes the drum 9 to revolve (due to spring 16) causing the pole 12 to revolve to position 12' shown in FIG. 1 and causing the hook to set in the fish's mouth.

In the modification shown in FIG. 6, there is added spring tension put on the lever 25 to overcome the possibility that a slight jiggle of the pole 12 might release the lever pin 25 causing the drum 9 to revolve before there is a nibble of a fish on the line.

In FIGURE 7 there is shown a hook 37 with a screw threaded end 38. This hook 37 is used in place of a standard pole 1 and is used for attaching device 2. This is accomplished by resilient body 6b and threaded edges 6a which are held by ring 5. This form of connecting attachment device 2 is used where device is to be connected to the gunwale of a boat, the dock, a log, or to the river bank and may be used in place of a fish pole bit indicator. Hook 37 may be made in various angular shapes or straight and is to be made of one piece of metal. The 6a and 6b parts are made of one piece of metal and integral with part 37.

It is believed that the advantages and use of the invention will be clearly apparent from the foregoing disclosure, and accordingly, further description thereof at this point is deemed unnecessary. While in the foregoing there has been described the preferred embodiments of this invention, it is to be understood that minor changes in the details of construction, combination and arrangements of parts may be resorted to without departing from the spirit and scope of the invention as claimed.

What is claimed as new is:

1. A standard fishing pole in combination with an attachment device to said in catching fish, said attachment device comprising a main cylindrical body having an arm extending from each side thereof, said body having an opening therein, the walls of said body forming said opening being internally threaded, a resilient, externally threaded insert threadingly engaging the threads of said opening, an internally threaded ring forming an extension of the body and threadingly engaging the threads of said insert, said insert having a central opening therein to receive one end of the fishing pole so that said body becomes an extension of said pole, an axle mounted between the arms extending from said body, a drum mounted for rotation on said axle, the drum being hollow and having an elongated opening in the circumferential surface thereof, an extension rod mounted for pivotal movement on said axle and extending through said opening in the drum, a knob fixed for rotation on one side of said drum and interposed between the drum and one of said arms, said knob constituting one side wall of said drum and having an abutment thereon extending into the hollow drum and having a series of openings on the outer surface thereof, the other side wall of the drum being integral therewith and having an abutment thereon, a coiled spring positioned between and fixed to said abutments so that movement of said knob relative to said drum places tension on said spring, retractable pin means on one of said arms for selectively engaging one of said openings in the outer surface of the knob, a two piece lever extending through the other of said arms and into the interior of said drum, one piece of said lever slidably extending through said other arm and being adapted to have a portion thereof extend slightly into the drum to prevent rotation thereof when tension is applied to said spring, the second piece of said lever having a rounded portion which is located below and is engageable with said extension rod, the extension rod having means on one end thereof to attach a fishing line and hook thereto, whereby when a fish pulls on the line the extension rod is slightly rotated and engages and cams the second piece of said lever outwardly from the drum and the second piece of the lever is thereby used to force the said one piece of said lever out of said drum so that the drum is then permitted to rotate due to the tension on the spring and carry the extension rod upwardly and set the fish hook in the fish.

2. A standard fishing pole in combination with an attachment device to aid in catching fish according to claim 1 in which there is included a spring adjustable cap for adjusting tension of the said two piece lever against the fish pole extension.

References Cited in the file of this patent
UNITED STATES PATENTS

| | | |
|---|---|---|
| 2,461,356 | Sus et al. | Feb. 8, 1949 |
| 2,482,999 | Bean | Sept. 27, 1949 |
| 2,887,812 | Staskiews et al. | May 26, 1959 |